US008626815B1

(12) United States Patent
Langhammer (10) Patent No.: US 8,626,815 B1
(45) Date of Patent: Jan. 7, 2014

(54) CONFIGURING A PROGRAMMABLE INTEGRATED CIRCUIT DEVICE TO PERFORM MATRIX MULTIPLICATION

(75) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 1061 days.

(21) Appl. No.: 12/396,739

(22) Filed: Mar. 3, 2009

Related U.S. Application Data

(60) Provisional application No. 61/080,499, filed on Jul. 14, 2008.

(51) Int. Cl.
*G06F 17/14* (2006.01)
*G06F 7/38* (2006.01)
*G06F 7/32* (2006.01)
*G06F 7/52* (2006.01)

(52) U.S. Cl.
USPC ........... 708/607; 708/400; 708/401; 708/446; 708/495; 708/520; 708/524

(58) Field of Classification Search
None
See application file for complete search history.

(56) References Cited

U.S. PATENT DOCUMENTS

| | | |
|---|---|---|
| 3,473,160 A | 10/1969 | Wahlstrom |
| 4,156,927 A | 5/1979 | McElroy et al. |
| 4,179,746 A | 12/1979 | Tubbs |
| 4,212,076 A | 7/1980 | Conners |
| 4,215,406 A | 7/1980 | Gomola et al. |
| 4,215,407 A | 7/1980 | Gomola et al. |
| 4,422,155 A | 12/1983 | Amir et al. |
| 4,484,259 A | 11/1984 | Palmer et al. |
| 4,521,907 A | 6/1985 | Amir et al. |
| 4,597,053 A | 6/1986 | Chamberlin |
| 4,623,961 A | 11/1986 | Mackiewicz |

(Continued)

FOREIGN PATENT DOCUMENTS

| | | |
|---|---|---|
| EP | 0 158 430 | 10/1985 |
| EP | 0 380 456 | 8/1990 |

(Continued)

OTHER PUBLICATIONS

"Matlab—Some basics—data." University of Utah Department of Mathematics. Sep. 8, 1998. Found at http://www.math.utah.edu/~eyre/computing/matlab-intro/program.html (Sep. 16, 2013).*

(Continued)

*Primary Examiner* — Farley Abad
*Assistant Examiner* — Henry Yu
(74) *Attorney, Agent, or Firm* — Ropes & Gray LLP; Jeffrey H. Ingerman (57) ABSTRACT

In a matrix multiplication in which each element of the resultant matrix is the dot product of a row of a first matrix and a column of a second matrix, each row and column can be broken into manageable blocks, with each block loaded in turn to compute a smaller dot product, and then the results can be added together to obtain the desired row-column dot product. The earliest results for each dot product are saved for a number of clock cycles equal to the number of portions into which each row or column is divided. The results are then added to provide an element of the resultant matrix. To avoid repeated loading and unloading of the same data, all multiplications involving a particular row-block can be performed upon loading that row-block, with the results cached until other multiplications for the resultant elements that use the cached results are complete.

25 Claims, 5 Drawing Sheets

(56) References Cited

U.S. PATENT DOCUMENTS

| | | | |
|---|---|---|---|
| 4,682,302 A | 7/1987 | Williams | |
| 4,718,057 A | 1/1988 | Venkitakrishnan et al. | |
| 4,727,508 A | 2/1988 | Williams | |
| 4,791,590 A | 12/1988 | Ku et al. | |
| 4,799,004 A | 1/1989 | Mori | |
| 4,823,295 A | 4/1989 | Mader | |
| 4,839,847 A | 6/1989 | Laprade | |
| 4,871,930 A | 10/1989 | Wong et al. | |
| 4,912,345 A | 3/1990 | Steele et al. | |
| 4,967,160 A | 10/1990 | Quievy et al. | |
| 4,982,354 A | 1/1991 | Takeuchi et al. | |
| 4,994,997 A | 2/1991 | Martin et al. | |
| 5,014,235 A * | 5/1991 | Morton | 708/520 |
| 5,099,447 A * | 3/1992 | Myszewski | 708/607 |
| 5,122,685 A | 6/1992 | Chan et al. | |
| 5,128,559 A | 7/1992 | Steele | |
| 5,175,702 A | 12/1992 | Beraud et al. | |
| 5,208,491 A | 5/1993 | Ebeling et al. | |
| RE34,363 E | 8/1993 | Freeman | |
| 5,267,187 A | 11/1993 | Hsieh et al. | |
| 5,296,759 A | 3/1994 | Sutherland et al. | |
| 5,338,983 A | 8/1994 | Agarwala | |
| 5,349,250 A | 9/1994 | New | |
| 5,357,152 A | 10/1994 | Jennings, III et al. | |
| 5,371,422 A | 12/1994 | Patel et al. | |
| 5,381,357 A | 1/1995 | Wedgwood et al. | |
| 5,404,324 A | 4/1995 | Colon-Benet | |
| 5,424,589 A | 6/1995 | Dobbelaere et al. | |
| 5,446,651 A | 8/1995 | Moyse et al. | |
| 5,451,948 A | 9/1995 | Jekel | |
| 5,452,231 A | 9/1995 | Butts et al. | |
| 5,452,375 A | 9/1995 | Rousseau et al. | |
| 5,457,644 A | 10/1995 | McCollum | |
| 5,465,226 A | 11/1995 | Goto | |
| 5,465,375 A | 11/1995 | Thepaut et al. | |
| 5,483,178 A | 1/1996 | Costello et al. | |
| 5,497,498 A | 3/1996 | Taylor | |
| 5,500,828 A | 3/1996 | Doddington et al. | |
| 5,523,963 A | 6/1996 | Hsieh et al. | |
| 5,528,550 A | 6/1996 | Pawate et al. | |
| 5,537,601 A | 7/1996 | Kimura et al. | |
| 5,546,018 A | 8/1996 | New et al. | |
| 5,550,993 A | 8/1996 | Ehlig et al. | |
| 5,559,450 A | 9/1996 | Ngai et al. | |
| 5,563,526 A | 10/1996 | Hastings et al. | |
| 5,563,819 A | 10/1996 | Nelson | |
| 5,570,039 A | 10/1996 | Oswald et al. | |
| 5,570,040 A | 10/1996 | Lytle et al. | |
| 5,572,148 A | 11/1996 | Lytle et al. | |
| 5,581,501 A | 12/1996 | Sansbury et al. | |
| 5,590,350 A | 12/1996 | Guttag et al. | |
| 5,594,366 A | 1/1997 | Khong et al. | |
| 5,594,912 A | 1/1997 | Brueckmann et al. | |
| 5,596,763 A | 1/1997 | Guttag et al. | |
| 5,606,266 A | 2/1997 | Pedersen | |
| 5,617,058 A | 4/1997 | Adrian et al. | |
| 5,633,601 A | 5/1997 | Nagaraj | |
| 5,636,150 A | 6/1997 | Okamoto | |
| 5,636,368 A | 6/1997 | Harrison et al. | |
| 5,640,578 A | 6/1997 | Balmer et al. | |
| 5,644,522 A | 7/1997 | Moyse et al. | |
| 5,646,545 A | 7/1997 | Trimberger et al. | |
| 5,648,732 A | 7/1997 | Duncan | |
| 5,652,903 A | 7/1997 | Weng et al. | |
| 5,655,069 A | 8/1997 | Ogawara et al. | |
| 5,664,192 A | 9/1997 | Lloyd et al. | |
| 5,689,195 A | 11/1997 | Cliff et al. | |
| 5,696,708 A | 12/1997 | Leung | |
| 5,729,495 A | 3/1998 | Madurawe | |
| 5,740,404 A | 4/1998 | Baji | |
| 5,744,980 A | 4/1998 | McGowan et al. | |
| 5,744,991 A | 4/1998 | Jefferson et al. | |
| 5,754,459 A | 5/1998 | Telikepalli | |
| 5,761,483 A | 6/1998 | Trimberger | |
| 5,764,555 A | 6/1998 | McPherson et al. | |
| 5,768,613 A | 6/1998 | Asghar | |
| 5,777,912 A | 7/1998 | Leung et al. | |
| 5,784,636 A | 7/1998 | Rupp | |
| 5,790,446 A | 8/1998 | Yu et al. | |
| 5,794,067 A | 8/1998 | Kadowaki | |
| 5,801,546 A | 9/1998 | Pierce et al. | |
| 5,805,477 A | 9/1998 | Perner | |
| 5,805,913 A | 9/1998 | Guttag et al. | |
| 5,812,479 A | 9/1998 | Cliff et al. | |
| 5,812,562 A | 9/1998 | Baeg | |
| 5,815,422 A | 9/1998 | Dockser | |
| 5,821,776 A | 10/1998 | McGowan | |
| 5,825,202 A | 10/1998 | Tavana et al. | |
| 5,838,165 A | 11/1998 | Chatter | |
| 5,841,684 A | 11/1998 | Dockser | |
| 5,847,579 A | 12/1998 | Trimberger | |
| 5,859,878 A | 1/1999 | Phillips et al. | |
| 5,869,979 A | 2/1999 | Bocchino | |
| 5,872,380 A | 2/1999 | Rostoker et al. | |
| 5,874,834 A | 2/1999 | New | |
| 5,878,250 A | 3/1999 | LeBlanc | |
| 5,880,981 A | 3/1999 | Kojima et al. | |
| 5,892,962 A | 4/1999 | Cloutier | |
| 5,894,228 A | 4/1999 | Reddy et al. | |
| 5,898,602 A | 4/1999 | Rothman et al. | |
| 5,931,898 A | 8/1999 | Khoury | |
| 5,942,914 A | 8/1999 | Reddy et al. | |
| 5,944,774 A | 8/1999 | Dent | |
| 5,949,710 A | 9/1999 | Pass et al. | |
| 5,951,673 A | 9/1999 | Miyata | |
| 5,956,265 A | 9/1999 | Lewis | |
| 5,959,871 A | 9/1999 | Pierzchala et al. | |
| 5,960,193 A | 9/1999 | Guttag et al. | |
| 5,961,635 A | 10/1999 | Guttag et al. | |
| 5,963,048 A | 10/1999 | Harrison et al. | |
| 5,963,050 A | 10/1999 | Young et al. | |
| 5,968,196 A | 10/1999 | Ramamurthy et al. | |
| 5,970,254 A | 10/1999 | Cooke et al. | |
| 5,978,260 A | 11/1999 | Trimberger et al. | |
| 5,982,195 A | 11/1999 | Cliff et al. | |
| 5,986,465 A | 11/1999 | Mendel | |
| 5,991,788 A | 11/1999 | Mintzer | |
| 5,991,898 A | 11/1999 | Rajski et al. | |
| 5,995,748 A | 11/1999 | Guttag et al. | |
| 5,999,015 A | 12/1999 | Cliff et al. | |
| 5,999,990 A | 12/1999 | Sharrit et al. | |
| 6,005,806 A | 12/1999 | Madurawe et al. | |
| 6,006,321 A | 12/1999 | Abbott | |
| 6,009,451 A | 12/1999 | Burns | |
| 6,020,759 A | 2/2000 | Heile | |
| 6,021,423 A | 2/2000 | Nag et al. | |
| 6,029,187 A | 2/2000 | Verbauwhede | |
| 6,031,763 A | 2/2000 | Sansbury | |
| 6,041,340 A | 3/2000 | Mintzer | |
| 6,052,327 A | 4/2000 | Reddy et al. | |
| 6,052,755 A | 4/2000 | Terrill et al. | |
| 6,064,614 A | 5/2000 | Khoury | |
| 6,065,131 A | 5/2000 | Andrews et al. | |
| 6,066,960 A | 5/2000 | Pedersen | |
| 6,069,487 A | 5/2000 | Lane et al. | |
| 6,072,994 A | 6/2000 | Phillips et al. | |
| 6,073,154 A | 6/2000 | Dick | |
| 6,075,381 A | 6/2000 | LaBerge | |
| 6,084,429 A | 7/2000 | Trimberger | |
| 6,085,317 A | 7/2000 | Smith | |
| 6,091,261 A | 7/2000 | DeLange | |
| 6,091,765 A | 7/2000 | Pietzold, III et al. | |
| 6,094,726 A | 7/2000 | Gonion et al. | |
| 6,097,988 A | 8/2000 | Tobias | |
| 6,098,163 A | 8/2000 | Guttag et al. | |
| 6,107,820 A | 8/2000 | Jefferson et al. | |
| 6,107,821 A | 8/2000 | Kelem et al. | |
| 6,107,824 A | 8/2000 | Reddy et al. | |
| 6,130,554 A | 10/2000 | Kolze et al. | |
| 6,140,839 A | 10/2000 | Kaviani et al. | |
| 6,154,049 A | 11/2000 | New | |
| 6,157,210 A | 12/2000 | Zaveri et al. | |
| 6,163,788 A | 12/2000 | Chen et al. | |
| 6,167,415 A | 12/2000 | Fischer et al. | |

(56) References Cited

U.S. PATENT DOCUMENTS

| | | |
|---|---|---|
| 6,175,849 B1 | 1/2001 | Smith |
| 6,215,326 B1 | 4/2001 | Jefferson et al. |
| 6,226,735 B1 | 5/2001 | Mirsky |
| 6,242,947 B1 | 6/2001 | Trimberger |
| 6,243,729 B1 | 6/2001 | Staszewski |
| 6,246,258 B1 | 6/2001 | Lesea |
| 6,279,021 B1 | 8/2001 | Takano et al. |
| 6,286,024 B1 | 9/2001 | Yano et al. |
| 6,314,442 B1 | 11/2001 | Suzuki |
| 6,314,551 B1 | 11/2001 | Borland |
| 6,321,246 B1 | 11/2001 | Page et al. |
| 6,323,680 B1 | 11/2001 | Pedersen et al. |
| 6,351,142 B1 | 2/2002 | Abbott |
| 6,359,468 B1 | 3/2002 | Park et al. |
| 6,362,650 B1 | 3/2002 | New et al. |
| 6,366,944 B1 | 4/2002 | Hossain et al. |
| 6,367,003 B1 | 4/2002 | Davis |
| 6,407,576 B1 | 6/2002 | Ngai et al. |
| 6,407,694 B1 | 6/2002 | Cox et al. |
| 6,438,570 B1 | 8/2002 | Miller |
| 6,453,382 B1 | 9/2002 | Heile |
| 6,467,017 B1 | 10/2002 | Ngai et al. |
| 6,480,980 B2 | 11/2002 | Koe |
| 6,483,343 B1 | 11/2002 | Faith et al. |
| 6,531,888 B2 | 3/2003 | Abbott |
| 6,538,470 B1 | 3/2003 | Langhammer et al. |
| 6,542,000 B1 | 4/2003 | Black et al. |
| 6,556,044 B2 | 4/2003 | Langhammer et al. |
| 6,557,092 B1 | 4/2003 | Callen |
| 6,571,268 B1 | 5/2003 | Giacalone et al. |
| 6,573,749 B2 | 6/2003 | New et al. |
| 6,574,762 B1 | 6/2003 | Karimi et al. |
| 6,591,283 B1 | 7/2003 | Conway et al. |
| 6,591,357 B2 | 7/2003 | Mirsky |
| 6,600,788 B1 | 7/2003 | Dick et al. |
| 6,628,140 B2 | 9/2003 | Langhammer et al. |
| 6,700,581 B2 | 3/2004 | Baldwin et al. |
| 6,725,441 B1 | 4/2004 | Keller et al. |
| 6,728,901 B1 | 4/2004 | Rajski et al. |
| 6,731,133 B1 | 5/2004 | Feng et al. |
| 6,744,278 B1 | 6/2004 | Liu et al. |
| 6,745,254 B2 | 6/2004 | Boggs et al. |
| 6,774,669 B1 | 8/2004 | Liu et al. |
| 6,781,408 B1 | 8/2004 | Langhammer |
| 6,781,410 B2 | 8/2004 | Pani et al. |
| 6,788,104 B2 | 9/2004 | Singh et al. |
| 6,836,839 B2 | 12/2004 | Master et al. |
| 6,874,079 B2 | 3/2005 | Hogenauer |
| 6,904,471 B2 | 6/2005 | Boggs et al. |
| 6,924,663 B2 | 8/2005 | Masui et al. |
| 6,971,083 B1 | 11/2005 | Farrugia et al. |
| 7,031,994 B2 * | 4/2006 | Lao et al. ............ 708/400 |
| 7,430,577 B2 * | 9/2008 | Buchert et al. ........ 708/524 |
| 7,469,266 B2 * | 12/2008 | Gustavson et al. ..... 708/520 |
| 7,483,932 B1 * | 1/2009 | Boucher ............. 708/401 |
| 2001/0029515 A1 | 10/2001 | Mirsky |
| 2002/0089348 A1 | 7/2002 | Langhammer |
| 2003/0088757 A1 | 5/2003 | Lindner et al. |
| 2004/0064770 A1 | 4/2004 | Xin |
| 2004/0083412 A1 | 4/2004 | Corbin et al. |
| 2004/0178818 A1 | 9/2004 | Crotty et al. |
| 2004/0181565 A1 * | 9/2004 | Ikeda ............... 708/446 |
| 2004/0193981 A1 | 9/2004 | Clark et al. |
| 2005/0071407 A1 * | 3/2005 | Gustavson et al. ..... 708/495 |
| 2005/0144215 A1 | 6/2005 | Simkins et al. |
| 2005/0166038 A1 | 7/2005 | Wang et al. |
| 2005/0187999 A1 | 8/2005 | Zheng et al. |
| 2006/0265445 A1 * | 11/2006 | Gustavson et al. ..... 708/520 |
| 2007/0185951 A1 | 8/2007 | Lee et al. |
| 2007/0185952 A1 | 8/2007 | Langhammer et al. |
| 2007/0271325 A1 * | 11/2007 | Juffa et al. .......... 708/607 |
| 2008/0133627 A1 | 6/2008 | Langhammer et al. |

FOREIGN PATENT DOCUMENTS

| | | |
|---|---|---|
| EP | 0 411 491 | 2/1991 |
| EP | 0 461 798 | 12/1991 |
| EP | 0 498 066 | 8/1992 |
| EP | 0 555 092 | 8/1993 |
| EP | 0 606 653 | 7/1994 |
| EP | 0 657 803 | 6/1995 |
| EP | 0 660 227 | 6/1995 |
| EP | 0 668 659 | 8/1995 |
| EP | 0 905 906 | 3/1999 |
| EP | 0 909 028 | 4/1999 |
| EP | 0 927 393 | 7/1999 |
| EP | 0 992 885 | 4/2000 |
| EP | 1 031 934 | 8/2000 |
| EP | 1 058 185 | 12/2000 |
| EP | 1 220 108 | 7/2002 |
| GB | 2 283 602 | 5/1995 |
| GB | 2 286 737 | 8/1995 |
| GB | 2 318 198 | 4/1998 |
| JP | 61-237133 | 10/1986 |
| JP | 7-135447 | 5/1995 |
| WO | WO95/27243 | 10/1995 |
| WO | WO96/28774 | 9/1996 |
| WO | WO97/08606 | 3/1997 |
| WO | WO98/12629 | 3/1998 |
| WO | WO98/32071 | 7/1998 |
| WO | WO98/38741 | 9/1998 |
| WO | WO99/22292 | 5/1999 |
| WO | WO99/31574 | 6/1999 |
| WO | WO99/56394 | 11/1999 |
| WO | WO00/51239 | 8/2000 |
| WO | WO00/52824 | 9/2000 |
| WO | WO01/13562 | 2/2001 |
| WO | WO2005/101190 | 10/2005 |

OTHER PUBLICATIONS

Amos, D., "PLD architectures match DSP algorithms " *Electronic Product Design*, vol. 17, No. 7, Jul. 1996, pp. 30, 32.

Analog Devices, Inc., The Applications Engineering Staff of Analog Devices, DSP Division, *Digital Signal Processing Applications Using the ADSP-2100 Family* (edited by Amy Mar), 1990, pp. 141-192).

Andrejas, J., et al., "Reusable DSP functions in FPGAs," *Field-Programmable Logic and Applications. Roadmap to Reconfigurable Computing. 10th International Conference, FPL 2000. Proceedings* (*Lecture Notes in Computer Science* vol. 1896), Aug. 27-30, 2000, pp. 456-461.

Aoki, T., "Signed-weight arithmetic and its application to a field-programmable digital filter architecture," *IEICE Transactions on Electronics* , 1999 , vol. E82C, No. 9, Sep. 1999, pp. 1687-1698.

Ashour, M.A., et al., "An FPGA implementation guide for some different types of serial-parallel multiplier-structures," *Microelectronics Journal* , vol. 31, No. 3, 2000, pp. 161-168.

Berg. B.L., et al."Designing Power and Area Efficient Multistage FIR Decimators with Economical Low Order Filters," *ChipCenter Technical Note*, Dec. 2001.

Bursky, D., "Programmable Logic Challenges Traditional ASIC SoC Designs", *Electronic Design*, Apr. 15, 2002.

Chhabra, A. et al., Texas Instruments Inc., "A Block Floating Point Implementation on the TMS320C54x DSP", Application Report SPRA610, Dec. 1999, pp. 1-10.

Colet, p., "When DSPs and FPGAs meet: Optimizing image processing architectures," *Advanced Imaging*, vol. 12, No. 9, Sep. 1997, pp. 14, 16, 18.

Crookes, D., et al., "Design and implementation of a high level programming environment for FPGA-based image processing," IEE Proceedings—Vision, Image and Signal Processing, vol. 147, No. 4, Aug. 2000, pp. 377-384.

Debowski, L., et al., "A new flexible architecture of digital control systems based on DSP and complex CPLD technology for power conversion applications," *PCIM 2000: Europe Official Proceedings of the Thirty-Seventh International Intelligent Motion Conference*, Jun. 6-8, 2000, pp. 281-286. Dick, C., et al., "Configurable logic for (56) References Cited

OTHER PUBLICATIONS digital communications: some signal processing perspectives," *IEEE Communications Magazine*, vol. 37, No. 8, Aug. 1999, pp. 107-111.
Do, T.-T., et al., "A flexible implementation of high-performance FIR filters on Xilinx FPGAs," *Field-Programmable Logic and Applications: From FPGAs to Computing Paradigm. 8th International Workshop, FPL '98. Proceedings*, Hartenstein, R.W., et al., eds., Aug. 31-Sep. 3, 1998, pp. 441-445.
Gaffer, A.A., et al., "Floating-Point Bitwidth Analysis via Automatic Differentiation," *IEEE Conference on Field Programmable Technology*, Hong Kong, Dec. 2002.
Guccione, S.A., "Run-time Reconfiguration at Xilinx," *Parallel and distributed processing: 15 IPDPS 2000 workshops*, Rolim, J., ed., May 1-5, 2000, p. 873.
Hauck, S., "The Future of Reconfigurable Systems," *Keynote Address, 5th Canadian Conference on Field Programmable Devices*, Jun. 1998, http://www.ee.washington.edu/people/faculty/hauck/publications/ ReconfigFuture.PDF.
Heysters, P.M., et al., "Mapping of DSP algorithms on field programmable function arrays," *Field-Programmable Logic and Applications. Roadmap to Reconfigurable Computing. 10th International Conference, FPL 2000. Proceedings (Lecture Notes in Computer Science* vol. 1896) Aug. 27-30, 2000, pp. 400-411.
Huang, J., et al., "Simulated Performance of 1000BASE-T Receiver with Different Analog Front End Designs," *Proceedings of the 35th Asilomar Conference on Signals, Systems, and Computers*, Nov. 4-7, 2001.
Lattice Semiconductor Corp, *ORCA® FPGA Express™ Interface Manual: ispLEVER® Version 3.0*, 2002.
Lucent Technologies, Microelectronics Group, "Implementing and Optimizing Multipliers in ORCA™ FPGAs,", Application Note. AP97-008FGPA, Feb. 1997.
"Implementing Multipliers in FLEX 10K EABs", *Altera*, Mar. 1996.
"Implementing Logic with the Embedded Array in FLEX 10K Devices", *Altera*, May 2001, ver. 2.1.
Jinghua Li, "Design a pocket multi-bit multiplier in FPGA," *1996 2nd International Conference on ASIC Proceedings* (IEEE Cat. No. 96TH8140) Oct. 21-24, 1996, pp. 275-279.
Jones, G., "Field-programmable digital signal conditioning," *Electronic Product Design*, vol. 21, No. 6, Jun. 2000, pp. C36-C38.
Kiefer, R., et al., "Performance comparison of software/FPGA hardware partitions for a DSP application " *14th Australian Microelectronics Conference. Microelectronics: Technology Today for the Future. Micro '97 Proceedings*, Sep. 28-Oct. 1, 1997, pp. 88-93.
Kramberger, I., "DSP acceleration using a reconfigurable FPGA," *ISIE '99. Proceedings of the IEEE International Symposium on Industrial Electronics* (Cat. No. 99TH8465), vol. 3, Jul. 12-16, 1999, pp. 1522-1525.
Langhammer, M., "How to implement DSP in programmable logic " *Elettronica Oggi*, No. 266, Dec. 1998, pp. 113-115.
Langhammer, M., "Implementing a DSP in Programmable Logic " *Online EE Times*, May 1998, http://www.eetimes.com/editorial/1998/coverstory9805.html.
Lazaravich, B.V., "Function block oriented field programmable logic arrays," *Motorola, Inc. Technical Developments*, vol. 18, Mar. 1993, pp. 10-11.
Lund, D., et al., "A new development system for reconfigurable digital signal processing," First International Conference on 3G Mobile Communication Technologies (Conf. Publ. No. 471), Mar. 27-29, 2000, pp. 306-310.
Miller, N.L., et al., "Reconfigurable integrated circuit for high performance computer arithmetic," *Proceedings of the 1998 IEE Colloquium on Evolvable Hardware Systems (Digest)* No. 233, 1998, pp. 2/1-2/4.
Mintzer, L., "Xilinx FPGA as an FFT processor," *Electronic Engineering*, vol. 69, No. 845, May 1997, pp. 81, 82, 84.
Faura et al., "A Novel Mixed Signal Programmable Device With On-Chip Microprocessor," Custom Integrated Circuits Conference, 1997. Proceedings of the IEEE 1997 Santa Clara, CA, USA, May 5, 1997, pp. 103-106.

Nozal, L., et al., "A new vision system: programmable logic devices and digital signal processor architecture (PLD+DSP)," *Proceedings IECON '91. 1991 International Conference on Industrial Electronics, Control and Instrumentation* (Cat. No. 91CH2976-9) vol. 3, Oct. 28-Nov. 1, 1991, pp. 2014-2018.
Papenfuss, J.R, et al., "Implementation of a real-time, frequency selective, RF channel simulator using a hybrid DSP-FPGA architecture," *RAWCON 2000: 2000 IEEE Radio and Wireless Conference* (Cat. No. 00EX404), Sep. 10-13, 2000, pp. 135-138.
Parhami, B., "Configurable arithmetic arrays with data-driven control " *34th Asilomar Conference on Signals, Systems and Computers*, vol. 1, 2000, pp. 89-93.
"The QuickDSP Design Guide", Quicklogic, Aug. 2001, revision B.
"QuickDSP™ Family Data Sheet", *Quicklogic*, Aug. 7, 2001, revision B.
Rangasayee, K., "Complex PLDs let you produce efficient arithmetic designs," *EDN (European Edition)*, vol. 41, No. 13, Jun. 20, 1996, pp. 109, 110, 112, 114, 116.
Rosado, A., et al., "A high-speed multiplier coprocessor unit based on FPGA," *Journal of Electrical Engineering*, vol. 48, No. 11-12, 1997, pp. 298-302.
Santillan-Q., G.F., et al., "Real-time integer convolution implemented using systolic arrays and a digit-serial architecture in complex programmable logic devices," *Proceedings of the Third International Workshop on Design of Mixed-Mode Integrated Circuits and Applications* (Cat. No. 99EX303), Jul. 26-28, 1999, pp. 147-150.
Texas Instruments Inc., "TMS320C54x DSP Reference Set, vol. 1: CPU and Peripherals", Literature No. SPRU131F, Apr. 1999, pp. 2-1 through 2-16 and 4-1 through 4-29.
Tisserand, A., et al., "An on-line arithmetic based FPGA for low power custom computing," *Field Programmable Logic and Applications, 9th International Workshop, FPL'99, Proceedings (Lecture Notes in Computer Science* vol. 1673), Lysaght, P., et al., eds., Aug. 30-Sep. 1, 1999, pp. 264-273.
Tralka, C., " Symbiosis of DSP and PLD," *Elektronik*, vol. 49, No. 14, Jul. 11, 2000, pp. 84-96.
Valls, J., et al., "A Study About FPGA-Based Digital Filters," *Signal Processing Systems*, 1998, SIPS 98, 1998 IEEE Workshop, Oct. 10, 1998, pp. 192-201.
"Virtex-II 1.5V Field-Programmable Gate Arrays", *Xilinx*, Jan. 25, 2001, module 2 of 4.
"Virtex-II 1.5V Field-Programmable Gate Arrays", *Xilinx*, Apr. 2, 2001, module 1 of 4.
"Virtex-II 1.5V Field-Programmable Gate Arrays", *Xilinx*, Apr. 2, 2001, module 2 of 4.
Walters, A.L., "A Scaleable FIR Filter Implementation Using 32-bit Floating-Point Complex Arithmetic on ,a FPGA Based Custom Computing Platform," Allison L. Walters, Thesis Submitted to the Faculty of Virginia Polytechnic Institute and State University, Jan. 30, 1998.
Weisstein, E.W., "Karatsuba Multiplication " *MathWorld—A Wolfram Web Resource* (Dec. 9, 2007), accessed Dec. 11, 2007 at http://mathworld.wolfram.com/KaratsubaMultiplication.html.
Wenzel, L., "Field programmable gate arrays (FPGAs) to replace digital signal processor integrated circuits," *Elektronik*, vol. 49, No. 5, Mar. 7, 2000, pp. 78-86.
"Xilinx Unveils New FPGA Architecture to Enable High-Performance, 10 Million System Gate Designs", *Xilinx*, Jun. 22, 2000.
"Xilinx Announces DSP Algorithms, Tools and Features for Virtex-II Architecture", *Xilinx*, Nov. 21, 2000.
Xilinx Inc., "Virtex-II 1.5V Field-Programmable Gate Arrays", Advance Product Specification, DS031-2 (v1.9), Nov. 29, 2001, Module 2 of 4, pp. 1-39.
Xilinx Inc., "Using Embedded Multipliers", Virtex-II Platform FPGA Handbook, UG002 (v1.3), Dec. 3, 2001, pp. 251-257.
Xilinx, Inc., "A 1D Systolic FIR," copyright 1994-2002, downloaded from http://www.iro.umontreal.ca/~aboulham/F6221/Xilinx%20A%201D%20systolic%20FIR.htm.
Xilinx, Inc., "The Future of FPGA's," White Paper, available Nov. 14, 2005 for download from http://www.xilinx.com/prs_rls,5yrwhite.htm.

* cited by examiner

| A1*E1+<br>A2*E2+<br>A3*E3 | A1*F1+<br>A2*F2+<br>A3*F3 | A1*G1+<br>A2*G2+<br>A3*G3 | ..... |

CONFIGURING A PROGRAMMABLE INTEGRATED CIRCUIT DEVICE TO PERFORM MATRIX MULTIPLICATION

CROSS REFERENCE TO RELATED APPLICATION

This claims the benefit of commonly-assigned U.S. Provisional Patent Application No. 61/080,499, filed Jul. 14, 2008, which is hereby incorporated by reference herein in its entirety.

BACKGROUND OF THE INVENTION

This invention relates to the use of programmable integrated circuit devices (e.g., field-programmable gate arrays or other programmable logic devices (PLDs)) to perform matrix multiplication operations.

In a multiplication of two input matrices AA and BB to form resultant matrix CC, each resultant element $c_{ij}$ in the resultant matrix CC will be the dot product of the ith row in matrix AA and the jth column in matrix BB. For example, $c_{57}$ will be the dot product of the fifth row of matrix AA and the seventh column of matrix BB. The length of a row of (i.e., the number of columns, k, in) matrix AA is equal to the height of a column of (i.e., the number of rows in) matrix BB. As is evident, the computation of each element $c_{ij}$ requires k multiplications. Moreover, there are i×j elements $c_{ij}$ in matrix CC, for a total of i×j×k multiplications. For large matrices (with, e.g., hundreds of elements per dimension), there may not be enough multipliers and logic resources available on a programmable integrated circuit device, such as an FPGA, to perform even the k multiplications to multiply just one row and column together for a single resultant element $c_{ij}$. k−1 adders also are required to add the individual products to obtain the dot product.

SUMMARY OF THE INVENTION

This disclosure describes a method and a structure whereby multiple small dot products can be effectively combined to generate a larger dot product, for each element of a matrix multiplication. A programmable integrated circuit device may be configured as such a structure, to carry out the method.

Specifically, to deal with the need for a greater number of multipliers than are available just to perform one row-column dot product for one resultant element $c_{ij}$, each row and each column can be broken into manageable blocks, with each block loaded in turn to compute a smaller dot product, and then the results can be added together to obtain the desired row-column dot product. The earliest results for each dot product are saved for a number of clock cycles equal to the number of portions N into which each row or column is divided. This can be done with an N-element shift register. The contents of the elements are then added, using N−1 adders, to provide an element $c_{ij}$ of the resultant matrix. No accumulation is required.

However, as described in more detail below, this results in repeated loading and unloading of the same blocks at different times as different elements are computed. Moreover, one must have sufficient bandwidth to load all of the values, and memory bandwidth decreases with increasing memory size (because the ratio of edge to area decreases), so that the delays in multiple loadings and unloadings of the same blocks is magnified by the bandwidth bottleneck, increasing the number of clock cycles required to compute a single $c_{ij}$ calculation.

Accordingly, pursuant to another aspect of the invention, instead of performing all parts of one $c_{ij}$ calculation in order and then moving on to the next $c_{ij}$ calculation, each block or portion of a row is loaded and all calculations that use that block or portion with a block or portion of any column—for any of the $c_{ij}$—are carried out. As a result, no $c_{ij}$ computation can be completed until the partial calculations using the last block or portion of the row in question begin. Therefore, the partial calculations are stored in a set of cache memories.

In one embodiment, the number of caches is equal to the number N of portions into which each row or column is divided. Each nth cache stores the respective dot products of an nth row-block of matrix AA with the respective nth column-blocks of the columns of matrix BB. Therefore, each $c_{ij}$ is spread across corresponding locations in the N caches—i.e., $c_{ij}$ is spread across the N jth locations of the N caches. However, once the Nth cache begins to fill, each $c_{ij}$ can be burst out as soon as the corresponding location in the Nth cache is computed. Thus, once results start to become available, a new result is burst out on each clock cycle. Specifically, each $c_{ij}$ for the ith row will be available on $(N(N-1)+j)$th clock cycle of computations for that row.

By using one loading of a partial row of matrix AA to compute all products of that partial row and any partial column of matrix BB with which it must be multiplied, this approach increases the effective bandwidth of the memory used to store matrix AA, and reduces power consumption by reducing memory access.

Therefore, in accordance with the present invention, there is provided a method of configuring a programmable integrated circuit device to perform multiplication of a first multiplicand matrix by a second multiplicand matrix to form a resultant matrix, where the first multiplicand matrix has a first number of rows and a second number of columns, the second multiplicand matrix has that second number of rows and a third number of columns, and the resultant matrix has a number of elements equal to a product of the first and third numbers. The method includes configuring logic of the programmable integrated circuit device as a fourth number of multipliers, where the fourth number is one-Nth of the second number. Logic of the programmable integrated circuit device is configured to break down each row of the first multiplicand matrix into N row-blocks and to break down each column of the second multiplicand matrix into N column-blocks, and to use the fourth number of multipliers to form a respective dot-product of each of the row-blocks with a respective one of the column-blocks to form N partial dot products of each respective row of the first multiplicand matrix and a corresponding column of the second multiplicand matrix. Logic of the programmable integrated circuit device is configured to save each of the N partial dot products until all of the N partial dot products have been computed. Logic of the programmable integrated circuit device is configured to add the N partial dot products to provide an element of the resultant matrix corresponding to the respective row of the first multiplicand matrix and the corresponding column of the second multiplicand matrix.

A programmable logic device so configured, and a machine-readable data storage medium encoded with software for performing the method, are also provided.

BRIEF DESCRIPTION OF THE DRAWINGS

Further features of the invention, its nature and various advantages will be apparent upon consideration of the following detailed description, taken in conjunction with the following drawings, in which like reference characters refer to like parts throughout, and in which.

DETAILED DESCRIPTION OF THE INVENTION

A matrix multiplier according to the present invention for use in programmable integrated circuit devices (such as, e.g., FPGAs) uses dot product calculation circuitry which may be built from programmable logic of the programmable integrated circuit device, and can process arbitrarily-sized matrices by using blocking within a row or column—i.e., by dividing each row or column into row-blocks or column-blocks. The dot product calculation circuitry may be constructed using a monolithic block of multipliers and adders. For example, such circuitry can be efficiently designed with a floating point compiler such as that described in copending, commonly-assigned U.S. patent application Ser. No. 11/625,655, filed Jan. 22, 2007, which is hereby incorporated by reference herein in its entirety.

For the purposes of illustration one can consider dot product calculation circuitry that has 32 elements, and therefore can process 32 inputs from a matrix AA row and 32 inputs from a matrix BB column. Such circuitry would include 32 multipliers, and a tree of 31 adders to sum all of the multipliers. One can further assume a matrix AA that is 10 rows by 96 columns (10×96), and a matrix BB that is 96 rows by 15 columns (96×15). Three separate 32-element dot products are required to calculate the 96-element dot product for each element in the resultant 10×15 matrix. The three smaller dot products, which are scalar numbers, are simply summed to generate the larger dot product.

Two examples will be shown. In a first, generic, example, both input matrices are stored in memory banks with symmetric bandwidth. In a second example, the two matrices are stored in memory banks with asymmetric bandwidth, such as devices sold by Altera Corporation, of San Jose, Calif., which have TriMatrix™ memory including memories of three different sizes located throughout the device for user applications.

Figure 1:
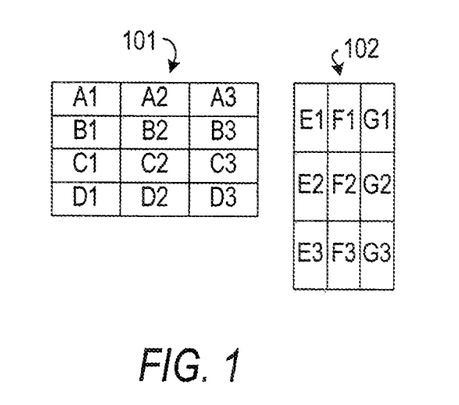
FIG. 1 is a logical representation of two matrices to be multiplied.

FIG. 1 shows the logical storage of matrix AA on the left (101), and matrix BB on the right (102), where the dot product is ⅓ the size of the matrix dimension, as in the 96/32 example above, so that each row of matrix AA and each column of matrix BB is divided into three portions (row-blocks or column-blocks). A straightforward matrix multiplication implementation would calculate each resultant element before moving on to the next. For example, the first three resultant elements (top row of the resultant matrix) would be <A1, E1>+<A2, E2>+<A3, E3>, <A1, F1>+<A2, F2>+<A3, F3>, and <A1, G1>+<A2, G2>+<A3, G3>. Assuming the physical memories were arranged so that all 32 elements of A1, A2, etc. could be read in a single clock cycle (i.e., with each column of matrix AA and each row of matrix BB in respective individual memories), then the sequence of reads would be as shown below in Table 1 (first seven reads shown).

TABLE 1

AA and BB Read Sequences

| Time Slot | Matrix AA | Matrix BB |
| --- | --- | --- |
| 0 | A1 | E1 |
| 1 | A2 | E2 |
| 2 | A3 | E3 |
| 3 | A1 | F1 |
| 4 | A2 | F2 |
| 5 | A3 | F3 |
| 6 | A1 | G1 |

Three clock cycles would be required to perform three dot product operations to generate one resultant element. The dot product datapath would have to be deeply pipelined because of its complexity, and may have a long latency, but once the first result arrived, the three dot product results would arrive on consecutive clock cycles. The earlier dot product results would have to be delayed, so that all three results could be added together when available. Accordingly, one resultant element would be generated every three clock cycles.

Figure 2:
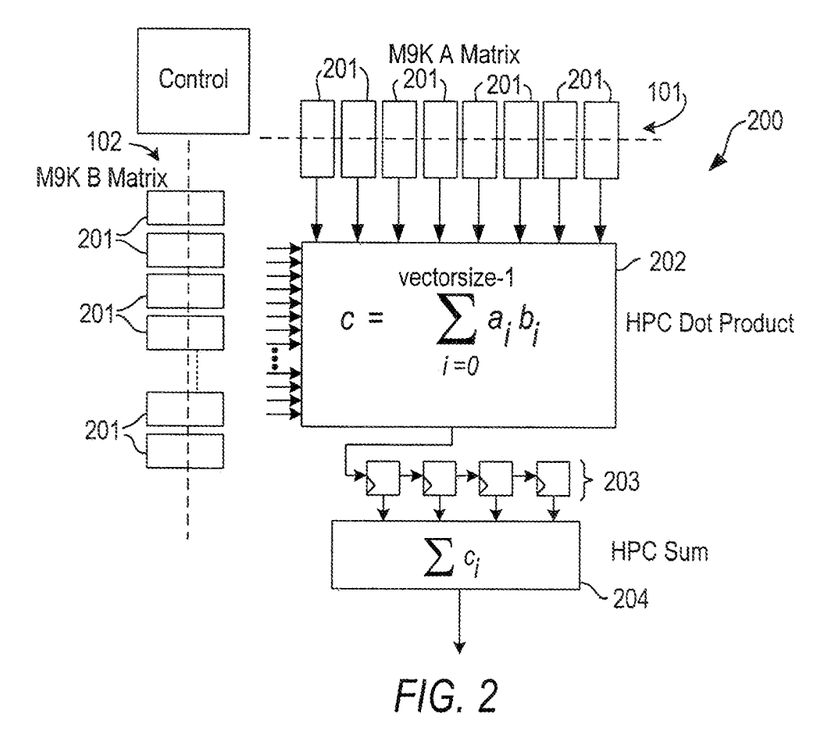
FIG. 2 shows a first embodiment of a structure for matrix multiplication in accordance with the present invention.

The architecture for this approach is shown in FIG. 2. Each row-block or column-block of each matrix AA or BB may be stored in a separate, relatively small memory block 201, such as one of the M9K RAM blocks provided in STRATIX® FPGAs from Altera Corporation. There may be as many separate blocks 201 for each dimension as there are elements in the dot product calculation circuitry 202, referred to in FIG. 2 as the HPC (high-performance computing) Dot Product. In other words, where the first row of a 96-column matrix AA includes columns 1-32 in row-block A1, columns 33-64 in row-block A2, and columns 65-96 in row-block A3, the three row-blocks are stored across 32 separate memory blocks 201. As among the three row-blocks of each row, corresponding values have the same column index (0:31), but a different sub-row index (0:2). Row-blocks B1, B2, B3 and the sub-rows of all subsequent rows are stored in the same way.

The column-blocks E1, E2, and E3 may be stored in a similar way in another bank of similar memory blocks 201. The subsequent column-blocks F1, F2, F3, and G1, G2, G3, etc. are stored with the row indices (0:2) and column indices (0:31).

The products of the row-blocks and the column-blocks may be stored in N shift registers 203. After N clock cycles, all shift registers 203 are filled and their contents can be added by HPC adder block 204, which is equivalent to N−1 adders. Thus, one result is output every N cycles. No accumulation is required. To support dynamic matrix sizes, there may be a large number of shift registers 203 of which only N are used, while the remainder are ignored. To that end, after each result is obtained, the contents of shift registers 203 may be zeroed by resetting or by clocking in a string of zeroes.

Figure 3:
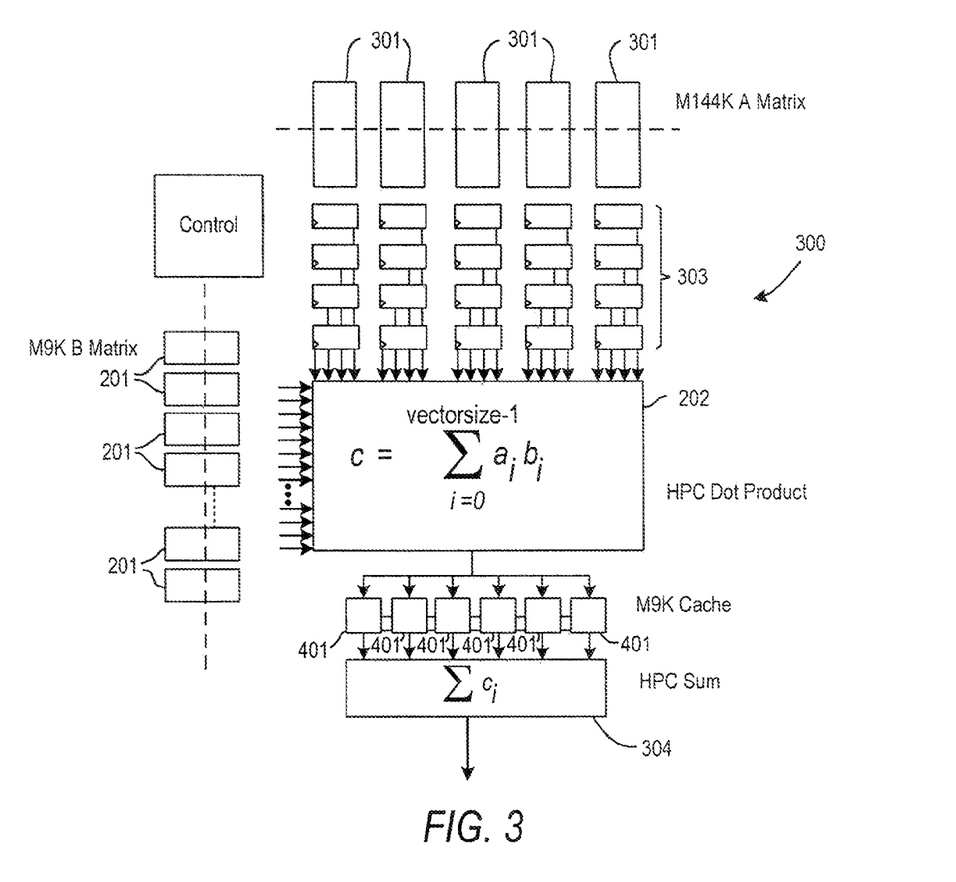
FIG. 3 shows a second embodiment of a structure for matrix multiplication in accordance with the present invention.

In the embodiment 200 of FIG. 2, two vectors are loaded in every clock cycle, which may consume a lot of power. In addition, there must be as much memory bandwidth available as the vector width. Some FPGAs (such as the STRATIX® family from Altera Corporation) have differing sizes of memory blocks. Larger memories are more area efficient, but have less bandwidth. Such devices can be used to support larger matrix sizes in the larger memories, but a different type of architecture 300 may be provided, as shown in FIG. 3.

Here, matrix BB may be stored as before, in smaller memories 201 such as the M9K memories described above. However, matrix AA may be stored in larger memory blocks 301, such as M144K memories available in certain STRATIX® FPGAs from Altera Corporation. As a result, the bandwidth of the matrix AA storage may be less than that of the vector multiplier. Therefore, multiple loads from the matrix AA storage may be needed, and are stored in local registers 303.

As before, each row-block of matrix AA (A1, A2, A3, B1, etc.) is multiplied multiple times by successive column-blocks of matrix BB. Each matrix AA row-block may be loaded once per group of matrix BB column-blocks. Each matrix AA row-block may be read over multiple clock cycles into the local registers 303, while each of the matrix BB column-blocks (E1, F1, G1, E2, etc.) may be loaded in a single clock cycle. The matrix BB bandwidth may be the same as that of the dot product calculating circuitry 202, so processing can be done at a rate of one row-block/one column-block per clock cycle. A conceptual representation of these memory accesses are shown in Table 2.

TABLE 2

AA and BB Read Sequences - Conceptual

| Time Slot | Matrix AA | Matrix BB |
|---|---|---|
| 0 | A1 | E1 |
| 1 |  | F1 |
| 2 |  | G1 |
| 3 | A2 | E2 |
| 4 |  | F2 |
| 5 |  | G2 |
| 6 | A3 | E3 |
| 7 |  | F3 |
| 8 |  | G3 |

Multiple reads are required for each vector from matrix AA. For example, assuming that four reads are required for each matrix AA row-block—i.e., there are eight larger memories, and four reads are required to fetch a new 32-element vector—the actual sequence (of the conceptual sequence shown in Table 2) is shown in Table 3.

TABLE 3

AA and BB Read Sequences - Actual

| Time Slot | Matrix AA | Matrix BB |
|---|---|---|
| 0 | A1-1 |  |
| 1 | A1-2 |  |
| 2 | A1-3 |  |
| 3 | A1-4 | E1 |
| 4 |  | F1 |
| 5 |  | G1 |
| 6 | A2-1 |  |
| 7 | A2-2 |  |
| 8 | A2-3 |  |
| 9 | A2-4 | E2 |
| 10 |  | F2 |
| 11 |  | G2 |
| 12 | A3-1 |  |
| 13 | A3-2 |  |
| 14 | A3-3 |  |
| 15 | A3-4 | E3 |
| 16 |  | F3 |
| 17 |  | G3 |

The difference in bandwidth causes a processing stall at the beginning of each row-block, and in this example with three matrix BB columns, the penalty is severe on a relative basis, but in a more realistic case of matrix dimensions with hundreds of elements, the penalty would be very small on a relative basis.

Figure 4:
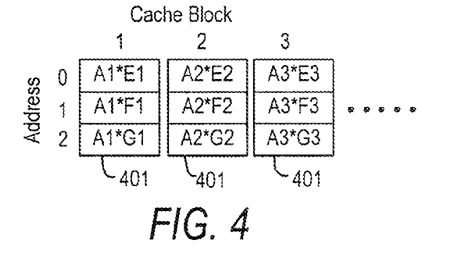
FIG. 4 shows an example of a cache addressing scheme in accordance with the invention.

Because the portions of the result are computed out of order, the dot product results for each row-block/column-block pair may be stored in a cache 401 as described below. Once an entire row of sub-columns of matrix BB (in the example E1, F1 and G1, or E2, F2 and G2, or E3, F3 and G3) has been processed, the matrix AA row index and matrix BB column index are increased by the number of elements in the vector, a new matrix AA row-block is loaded, and a new set of matrix BB sub-column processing is started. The results are again stored in a cache 401, in the next memory location.

The cache addressing scheme is shown in FIG. 4, which shows three cache memories (out of a potentially larger number), which are written to sequentially, but read in parallel. From FIG. 1, the first element in the resultant matrix is the sum of the dot products A1×E1, A2×E2, and A3×E3. The sequence of vector operations is A1×E1, A1×F1, A1×G1, A2×E2, and so on, which are stored in Cache 0/Address 0, Cache 0/Address 1, Cache 0/Address 2, Cache 1/Address 0, etc., respectively.

By the end of the computation of the ith row of resultant matrix CC, all of the row-blocks of the ith row of matrix AA will have been used for the last time, freeing up the cache memories for the (i+1)th row. Accordingly, the number of iterations per element—i.e., the number N of row-blocks per row of matrix AA, which is the same as the number of column-blocks per column of matrix BB (in this example, three) determines the number of cache memories 401 used.

A generic cache structure may be provided to support dynamic matrix sizes, in which case a larger number of memories 401 is provided in the cache. In such a case, the outputs of any unused cache memories 401 are zeroed. The depth of each cache memory 401 may be the same as number of columns in matrix AA (which is the number of rows in matrix BB). Cache memories 401 need not be double-buffered, because reading of the start of the memory may begin before writing of the partial vector products of the current matrix is complete.

Once a corresponding location has been written to in all of the cache memories that are being used, reading of all memories starts in parallel, beginning with location 0. In other words, taking a three-cache example, cache 0 will fill up first, followed by cache 1. After that, as soon as a location has been filled in cache 2, it may be read. Thus, as soon as cache 2/location 0 has been written, cache 0/location 0, cache 1/location 0, and cache 2/location 0 may be read, even though subsequent locations in cache2 are still being written. The outputs of the corresponding locations in each memory (e.g., cache 0/location 0, cache 1/location 0, and cache 2/location 0) are then summed, bursting out the result of computations involving an entire row of matrix AA (and column of matrix BB) as result as $c_{ij}$, with no accumulation required. The output burst for each element of matrix CC (i.e., for each $c_{ij}$) will follow the last cache memory write for a component of that element by the latency of summing block 304, but once started, a burst of a new $c_{ij}$ will occur on each of j consecutive clock cycles until the ith row of matrix CC is complete. The process will then begin again for the (i+1)th row, with another (N(N−1)+1) clock cycles passing until the (i+1)th row begins to burst out.

Figure 5:
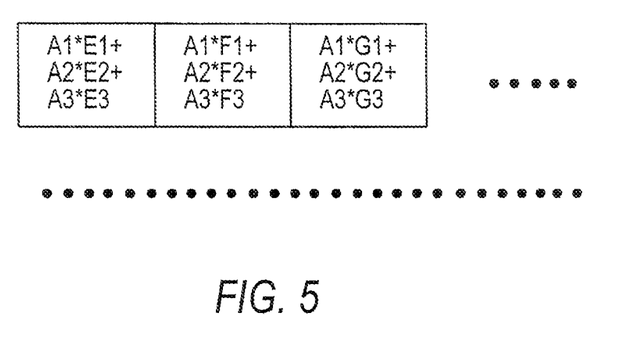
FIG. 5 shows an example of an output element calculation in accordance with the invention.

FIG. 5 shows the output element calculation, and comparison with FIG. 4 shows how each output calculation correlates to the cache storage locations.

Figure 6:
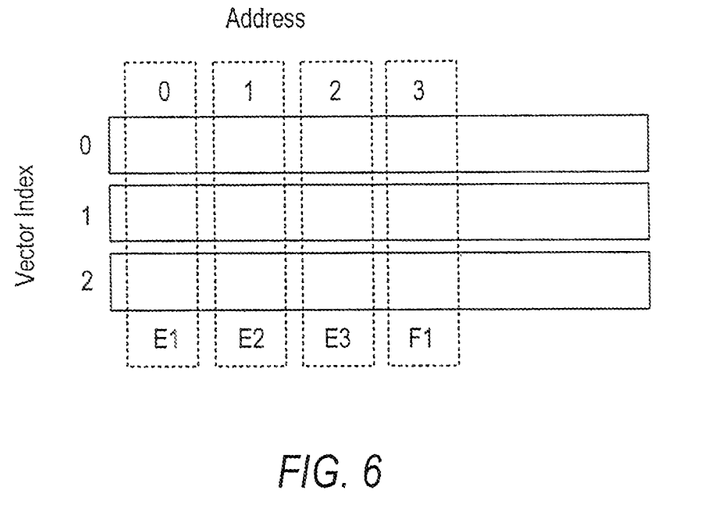
FIG. 6 shows the physical storage of one of the input matrices in accordance with the invention, to illustrate an example of a read pattern when using the invention.

FIG. 6 shows the physical storage of matrix BB. There are as many memory blocks as the number of elements in the dot product, which are all read in parallel. In this example, matrix BB is written to the storage column-by-column (E1, E2, E3, F1, F2, . . . ). However, the column-blocks are read row-by-row in order E1, F1, G1—in this case column-block 0/Address 0, column-block 0/Address 3, column-block 0/Address 6, column-block 1/Address 0, and so on, so the dot-product-width parallel access in this example uses an address sequence of 0, 3, 6, 1, 4, 7, 2, 5, 8.

In accordance with this invention, the time required for calculation of a matrix multiplication is reduced, both by avoiding multiple reads of the matrix AA row-blocks, and by bursting of the result cache element-by-element as a row of matrix CC is completed. This provides scalable and consistently high performance (e.g., greater than 100 billion floating-point operations per second—i.e., >100 GFLOPs).

Instructions for carrying out the method according to this invention may be encoded on a machine-readable medium, to be executed by a suitable computer or similar device to implement the method of the invention for programming or configuring PLDs to perform arithmetic operations in accordance with the format describe above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

Figure 7:
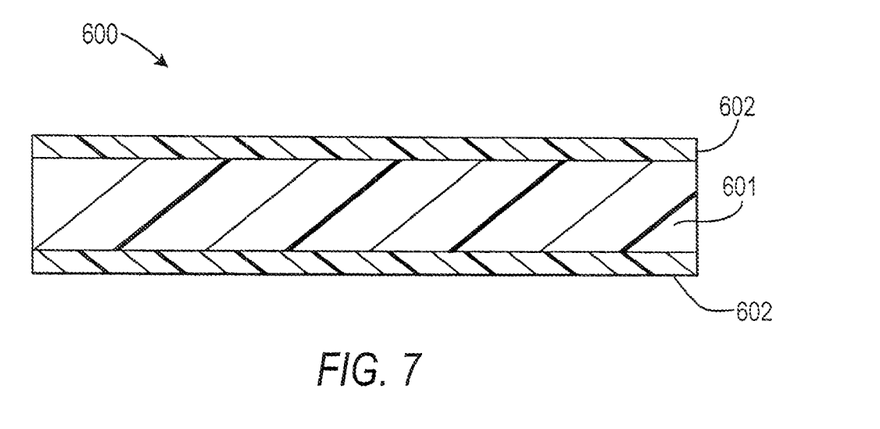
FIG. 7 is a cross-sectional view of a magnetic data storage medium encoded with a set of machine-executable instructions for performing the method according to the present invention.

FIG. 7 presents a cross section of a magnetic data storage medium 600 which can be encoded with a machine executable program that can be carried out by systems such as the aforementioned personal computer, or other computer or similar device. Medium 600 can be a floppy diskette or hard disk, or magnetic tape, having a suitable substrate 601, which may be conventional, and a suitable coating 602, which may be conventional, on one or both sides, containing magnetic domains (not visible) whose polarity or orientation can be altered magnetically. Except in the case where it is magnetic tape, medium 600 may also have an opening (not shown) for receiving the spindle of a disk drive or other data storage device.

The magnetic domains of coating 602 of medium 600 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 8:
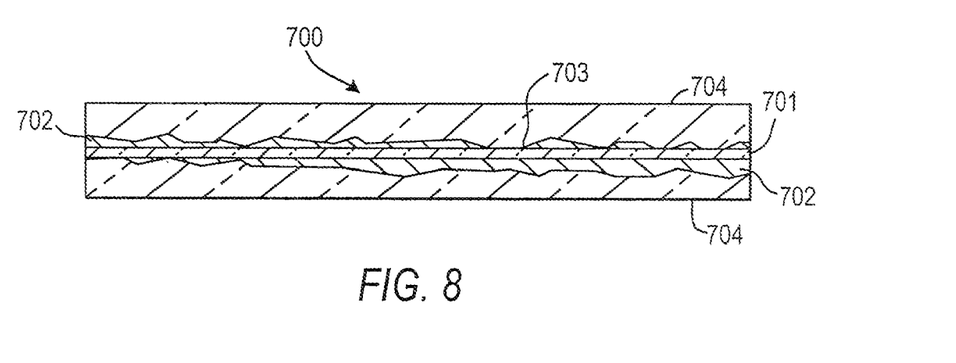
FIG. 8 is a cross-sectional view of an optically readable data storage medium encoded with a set of machine executable instructions for performing the method according to the present invention.

FIG. 8 shows a cross section of an optically-readable data storage medium 700 which also can be encoded with such a machine-executable program, which can be carried out by systems such as the aforementioned personal computer, or other computer or similar device. Medium 700 can be a conventional compact disk read only memory (CD-ROM) or digital video disk read only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 700 preferably has a suitable substrate 701, which may be conventional, and a suitable coating 702, which may be conventional, usually on one or both sides of substrate 701.

In the case of a CD-based or DVD-based medium, as is well known, coating 702 is reflective and is impressed with a plurality of pits 703, arranged on one or more layers, to encode the machine-executable program. The arrangement of pits is read by reflecting laser light off the surface of coating 702. A protective coating 704, which preferably is substantially transparent, is provided on top of coating 702.

In the case of magneto-optical disk, as is well known, coating 702 has no pits 703, but has a plurality of magnetic domains whose polarity or orientation can be changed magnetically when heated above a certain temperature, as by a laser (not shown). The orientation of the domains can be read by measuring the polarization of laser light reflected from coating 702. The arrangement of the domains encodes the program as described above.

Thus it is seen that a method for carrying out matrix multiplication, a programmable integrated circuit device programmed to perform the method, and software for carrying out the programming, have been provided.

A PLD 90 configured according to the present invention may be used in many kinds of electronic devices. One possible use is in a data processing system 900 shown in FIG. 9. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

Figure 9:
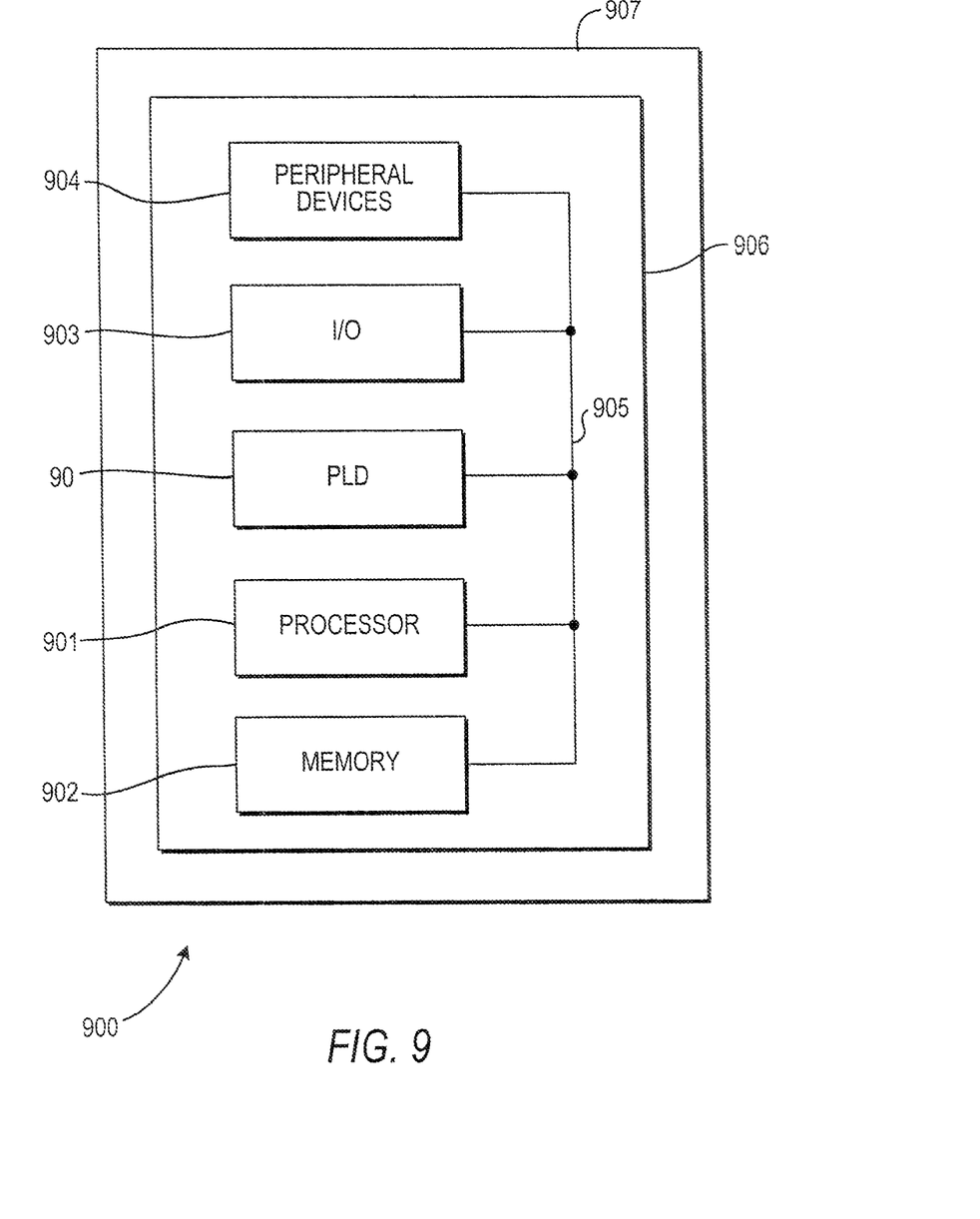
FIG. 9 is a simplified block diagram of an illustrative system employing a programmable logic device incorporating the present invention.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 281. PLD 90 may also be used as an arbiter for arbitrating access to a shared resources in system 900. In yet another example, PLD 90 can be configured as an interface between processor 281 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A method of configuring a programmable integrated circuit device to perform multiplication of a first multiplicand matrix by a second multiplicand matrix to form a resultant matrix, wherein said first multiplicand matrix has a first number of rows and a second number of columns, said second multiplicand matrix has said second number of rows and a third number of columns, and said resultant matrix has a number of elements equal to a product of said first and third numbers, said method comprising:

configuring logic of said programmable integrated circuit device as a fourth number of multipliers, wherein said fourth number is one-Nth of said second number;

configuring logic of said programmable integrated circuit device to break down each respective row of said first multiplicand matrix into N row-blocks and to break down each respective column of said second multiplicand matrix into N column-blocks, and to use said fourth number of multipliers to form a respective dot-product of each of said row-blocks with a respective one of said column-blocks to form N partial dot products of each respective row of said first multiplicand matrix and a corresponding respective column of said second multiplicand matrix, wherein:

each said row-block comprises more than one element of said respective row and fewer than all elements of said respective row, and each said column-block comprises more than one element of said respective column and fewer than all elements of said respective column, and     all respective ones of said partial dot products involving each respective one of said row-blocks and all of said column-blocks being formed before forming any partial dot product involving any other one of said row-blocks;

configuring logic of said programmable integrated circuit device to save each of said N partial dot products until all of said N partial dot products have been computed; and     configuring logic of said programmable integrated circuit device to add said N partial dot products to provide an element of said resultant matrix corresponding to said respective row of said first multiplicand matrix and said corresponding respective column of said second multiplicand matrix.

2. The method of claim 1 wherein said configuring said logic of said programmable integrated circuit device to save each of said N partial dot products comprises configuring said logic of said programmable integrated circuit device as at least one cache memory.

3. The method of claim 2 wherein said configuring said logic of said programmable integrated circuit device as at least one cache memory comprises configuring said logic of said programmable integrated circuit device as N cache memories for each dimension of said resultant matrix.

4. The method of claim 1 wherein:

said configuring logic of said programmable integrated circuit device to break down each respective row of said first multiplicand matrix into N row-blocks and to break down each respective column of said second multiplicand matrix into N column-blocks comprises configuring a first N random access memory blocks to store said row-blocks and a second N random access memory blocks to store said column-blocks; and     bandwidth of each said multiplier exceeds bandwidth of said memory blocks in at least one of said first N random access memory blocks and said second N random access memory blocks; said method further comprising:

configuring logic of said programmable integrated circuit device as a respective plurality of buffers for each of said random access memory blocks in said at least one of said first N random access memory blocks and said second N random access memory blocks, thereby enabling multiple read operations for reading data from said at least one of said first N random access memory blocks and said second N random access memory blocks for input to said multipliers.

5. The method of claim 1 wherein said configuring logic of said programmable integrated circuit device as a fourth number of multipliers comprises configuring said logic to use dedicated multipliers of said programmable integrated circuit device.

6. The method of claim 1 wherein said configuring logic of said programmable integrated circuit device to add said N partial dot products comprises configuring said logic to use dedicated adders of said programmable integrated circuit device.

7. A programmable integrated circuit device configured to perform multiplication of a first multiplicand matrix by a second multiplicand matrix to form a resultant matrix, wherein said first multiplicand matrix has a first number of rows and a second number of columns, said second multiplicand matrix has said second number of rows and a third number of columns, and said resultant matrix has a number of elements equal to a product of said first and third numbers, said programmable integrated circuit device comprising:

logic configured as a fourth number of multipliers, wherein said fourth number is one-Nth of said second number;

logic configured to break down each respective row of said first multiplicand matrix into N row-blocks and to break down each respective column of said second multiplicand matrix into N column-blocks, and to use said fourth number of multipliers to form a respective dot-product of each of said row-blocks with a respective one of said column-blocks to form N partial dot products of each respective row of said first multiplicand matrix and a corresponding respective column of said second multiplicand matrix, wherein:

each said row-block comprises more than one element of said respective row and fewer than all elements of said respective row, and each said column-block comprises more than one element of said respective column and fewer than all elements of said respective column, and     said logic configured to use said fourth number of multipliers is configured to form all respective ones of said partial dot products involving each respective one of said row-blocks and all of said column-blocks, before forming any partial dot product involving any other one of said row-blocks;

logic configured to save each of said N partial dot products until all of said N partial dot products have been computed; and     logic configured to add said N partial dot products to provide an element of said resultant matrix corresponding to said respective row of said first multiplicand matrix and said corresponding respective column of said second multiplicand matrix.

8. The configured programmable integrated circuit device of claim 7 wherein said logic configured to save each of said N partial dot products comprises logic configured as at least one cache memory.

9. The configured programmable integrated circuit device of claim 8 wherein said logic configured as at least one cache memory comprises logic configured as N cache memories for each dimension of said resultant matrix.

10. The configured programmable integrated circuit device of claim 7 wherein:

said logic configured to break down each respective row of said first multiplicand matrix into N row-blocks and to break down each respective column of said second multiplicand matrix into N column-blocks comprises a first N random access memory blocks configured to store said row-blocks and a second N random access memory blocks configured to store said column-blocks; and bandwidth of each said multiplier exceeds bandwidth of said memory blocks in at least one of said first N random access memory blocks and said second N random access memory blocks; said configured programmable integrated circuit device further comprising:

logic configured as a respective plurality of buffers for each of said random access memory blocks in said at least one of said first N random access memory blocks and said second N random access memory blocks, thereby enabling multiple read operations for reading data from said at least one of said first N random access memory blocks and said second N random access memory blocks for input to said multipliers.

11. The configured programmable integrated circuit device of claim 10 wherein said logic configured as a respective plurality of buffers comprises a plurality of registers.

12. The configured programmable integrated circuit device of claim 7 wherein said logic configured as a fourth number of multipliers comprises logic configured to use dedicated multipliers of said programmable integrated circuit device.

13. The configured programmable integrated circuit device of claim 7 wherein said logic configured to add said N partial dot products comprises logic configured to use dedicated adders of said programmable integrated circuit device.

14. A non-transitory machine-readable data storage medium encoded with machine-executable instructions for configuring a programmable integrated circuit device to execute a method of configuring a programmable integrated circuit device to perform multiplication of a first multiplicand matrix by a second multiplicand matrix to form a resultant matrix, wherein said first multiplicand matrix has a first number of rows and a second number of columns, said second multiplicand matrix has said second number of rows and a third number of columns, and said resultant matrix has a number of elements equal to a product of said first and third numbers, said instructions comprising:

instructions to configure logic of said programmable integrated circuit device as a fourth number of multipliers, wherein said fourth number is one-Nth of said second number;

instructions to configure logic of said programmable integrated circuit device to break down each respective row of said first multiplicand matrix into N row-blocks and to break down each respective column of said second multiplicand matrix into N column-blocks, and to use said fourth number of multipliers to form a respective dot-product of each of said row-blocks with a respective one of said column-blocks to form N partial dot products of each respective row of said first multiplicand matrix and a corresponding respective column of said second multiplicand matrix, wherein:

each said row-block comprises more than one element of said respective row and fewer than all elements of said respective row, and each said column-block comprises more than one element of said respective column and fewer than all elements of said respective column, and said instructions to configure said logic of said programmable integrated circuit device to use said fourth number of multipliers comprise instructions to configure said logic of said programmable integrated circuit device to form all respective ones of said partial dot products involving each respective one of said row-blocks and all of said column-blocks, before forming any partial dot product involving any other one of said row-blocks;

instructions to configure logic of said programmable integrated circuit device to save each of said N partial dot products until all of said N partial dot products have been computed; and instructions to configure logic of said programmable integrated circuit device to add said N partial dot products to provide an element of said resultant matrix corresponding to said respective row of said first multiplicand matrix and said corresponding respective column of said second multiplicand matrix.

15. The non-transitory machine-readable data storage medium of claim 14 wherein said instructions to configure said logic of said programmable integrated circuit device to save each of said N partial dot products comprises instructions to configure said logic of said programmable integrated circuit device as at least one cache memory.

16. The non-transitory machine-readable data storage medium of claim 15 wherein said instructions to configure said logic of said programmable integrated circuit device as at least one cache memory comprises instructions to configure said logic of said programmable integrated circuit device as N cache memories for each dimension of said resultant matrix.

17. The non-transitory machine-readable data storage medium of claim 14 wherein: said instructions to configure logic of said programmable integrated circuit device to break down each respective row of said first multiplicand matrix into N row-blocks and to break down each respective column of said second multiplicand matrix into N column-blocks comprises instructions to configure a first N random access memory blocks to store said row-blocks and a second N random access memory blocks to store said column-blocks;

bandwidth of each said multiplier exceeds bandwidth of each said cache memory; and said instructions further comprise instructions to configure logic of said programmable integrated circuit device as a respective plurality of buffers for each of said cache memories for at least one dimension of said resultant matrix, thereby enabling multiple read operations for reading data from said cache memories for input to said multipliers.

18. The non-transitory machine-readable data storage medium of claim 14 wherein said instructions to configure logic of said programmable integrated circuit device as a fourth number of multipliers comprises instructions to 5 configure said logic to use dedicated multipliers of said programmable integrated circuit device.

19. The non-transitory machine-readable data storage medium of claim 14 wherein said instructions to configure logic of said programmable integrated circuit device to add said N partial dot products comprises instructions to configure said logic to use dedicated adders of said programmable integrated circuit device.

20. Circuitry for performing multiplication of a first multiplicand matrix by a second multiplicand matrix to form a resultant matrix, wherein said first multiplicand matrix has a first number of rows and a second number of columns, said second multiplicand matrix has said second number of rows and a third number of columns, and said resultant matrix has a number of elements equal to a product of said first and third numbers, said circuitry comprising:

a fourth number of multipliers, wherein said fourth number is one-Nth of said second number;

logic configured to break down each respective row of said first multiplicand matrix into N row-blocks and to break down each respective column of said second multiplicand matrix into N column-blocks, and to use said fourth number of multipliers to form a respective dot-product of each of said row-blocks with a respective one of said column-blocks to form N partial dot products of each respective row of said first multiplicand matrix and a corresponding respective column of said second multiplicand matrix, wherein:

each said row-block comprises more than one element of said respective row and fewer than all elements of said respective row, and each said column-block comprises more than one element of said respective column and fewer than all elements of said respective column, and said logic configured to use said fourth number of multipliers is configured to form all respective ones of said partial dot products involving each respective one of said row-blocks and all of said column-blocks, before forming any partial dot product involving any other one of said row-blocks;

memory for saving each of said N partial dot products until all of said N partial dot products have been computed; and circuitry for adding said N partial dot products to provide an element of said resultant matrix corresponding to said respective row of said first multiplicand matrix and said corresponding respective column of said second multiplicand matrix.

21. The circuitry of claim 20 wherein said memory comprises at least one cache memory.

22. The circuitry of claim 21 wherein said memory comprises N cache memories for each dimension of said resultant matrix.

23. The circuitry of claim 20 wherein:

said logic configured to break down each respective row of said first multiplicand matrix into N row-blocks and to break down each respective column of said second multiplicand matrix into N column-blocks comprises a first N random access memory blocks configured to store said row-blocks and a second N random access memory blocks configured to store said column-blocks; and bandwidth of each said multiplier exceeds bandwidth of each said cache memory; said circuitry further comprising:

a respective plurality of buffers for each of said random access memory blocks in said at least one of said first N random access memory blocks and said second N random access memory blocks, thereby enabling multiple read operations for reading data from said at least one of said first N random access memory blocks and said second N random access memory blocks for input to said multipliers.

24. The circuitry of claim 23 wherein each said plurality of buffers comprises a plurality of registers.

25. The circuitry of claim 20 comprising a plurality of dynamically selectable cache memories, wherein N of said plurality of cache memories are dynamically configurable as said memory.

* * * * *